(No Model.) 7 Sheets—Sheet 1.

J. SMITH.
SOLE CUTTING MACHINE.

No. 426,870. Patented Apr. 29, 1890.

Fig. 1.

Witnesses
Carrie E. Nichols
H. Bruce Hartworth

Inventor
Jason Smith
Per Edwin W. Brown.
Attorney.

(No Model.) 7 Sheets—Sheet 2.

J. SMITH.
SOLE CUTTING MACHINE.

No. 426,870. Patented Apr. 29, 1890.

Witnesses
Carrie E. Nichols
H. Bruce Wentworth

Inventor
Jason Smith
Per Edwin W. Brown
Attorney (No Model.) 7 Sheets—Sheet 3.

J. SMITH.
SOLE CUTTING MACHINE.

No. 426,870. Patented Apr. 29, 1890.

Witnesses:
Carrie E. Nichols
H. Bruce Wentworth

Inventor:
Jason Smith
Per Edwin W. Brown
Attorney

(No Model.) 7 Sheets—Sheet 4.

J. SMITH.
SOLE CUTTING MACHINE.

No. 426,870. Patented Apr. 29, 1890.

Witnesses
Carrie E. Nichols
W. Bruce Wentworth

Inventor
Jason Smith
Per Edwin W. Brown
Attorney (No Model.) 7 Sheets—Sheet 6.

J. SMITH.
SOLE CUTTING MACHINE.

No. 426,870. Patented Apr. 29, 1890.

Witnesses.
Carrie E. Nichols
H. Bruce Wentworth

Inventor.
Jason Smith
Per Edwin W. Brown.
Attorney.

(No Model.) 7 Sheets—Sheet 7.

J. SMITH.
SOLE CUTTING MACHINE.

No. 426,870. Patented Apr. 29, 1890.

Witnesses
Carrie E. Nichols
H. Bruce Wentworth

Inventor
Jason Smith
Per Edwin W. Brown
Attorney.

UNITED STATES PATENT OFFICE.

JASON SMITH, OF ROCKLAND, MASSACHUSETTS.

SOLE-CUTTING MACHINE.

SPECIFICATION forming part of Letters Patent No. 426,870, dated April 29, 1890.

Application filed May 25, 1889. Serial No. 312,097. (No model.)

*To all whom it may concern:*

Be it known that I, JASON SMITH, of Rockland, in the county of Plymouth and State of Massachusetts, have invented certain new and useful Improvements in Sole-Cutting Machines, of which the following is a full, clear, and exact description.

This invention relates to a machine for cutting a sole for a boot or shoe from suitable sheet material, and particularly from sheet material in a strip form, the width of the strip being the length of a sole; and the invention consists of certain combination and construction and arrangement of parts in a machine for cutting soles of boots and shoes from any suitable sheet material, all substantially as hereinafter fully described, reference being had to the accompanying sheets of drawings, in which—

Fig. 4 is a plan view below section-line 4 4, Fig. 1. Fig. 6 is a detail plan view to be hereinafter referred to.

In the drawings, A represents a frame having legs B B B, which supports and carries the various parts of the machine.

Figure 10:
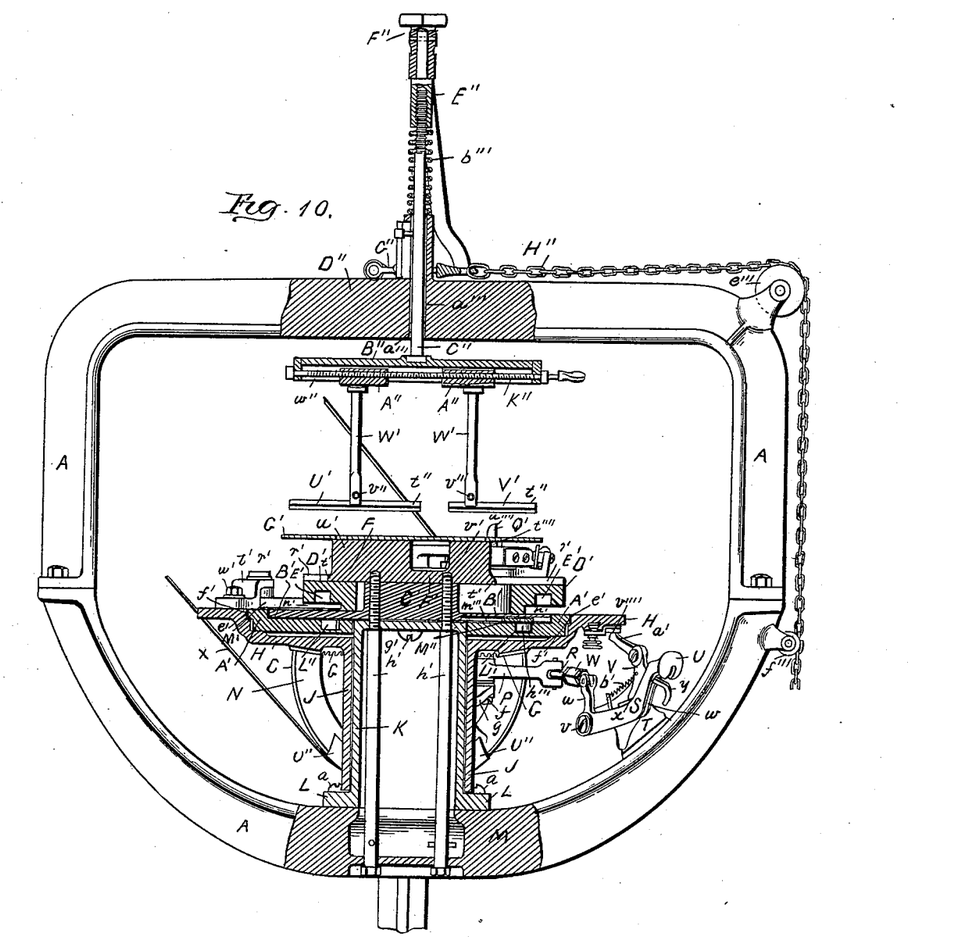
Fig. 10 is a partial front view and partial central transverse vertical section on line 10 10, Fig. 2.

C is a pulley mounted loosely on a horizontal shaft D, turning in bearings in upright arms E E of the rear portion of the frame A, which shaft has a bevel gear-wheel F on its other end arranged to engage with bevel gear-wheel G on the under side of a circular dish-shaped plate or disk H. This plate or disk has a downward central hollow cylindrical portion J, which fits over a hollow vertical cylinder K, secured by its bottom flange or rim L by screws a to the bed M of the frame, the lower end of the disk-cylinder J resting on such flange or rim, as shown in Fig. 10 more particularly.

Figures 7, 8, 9:
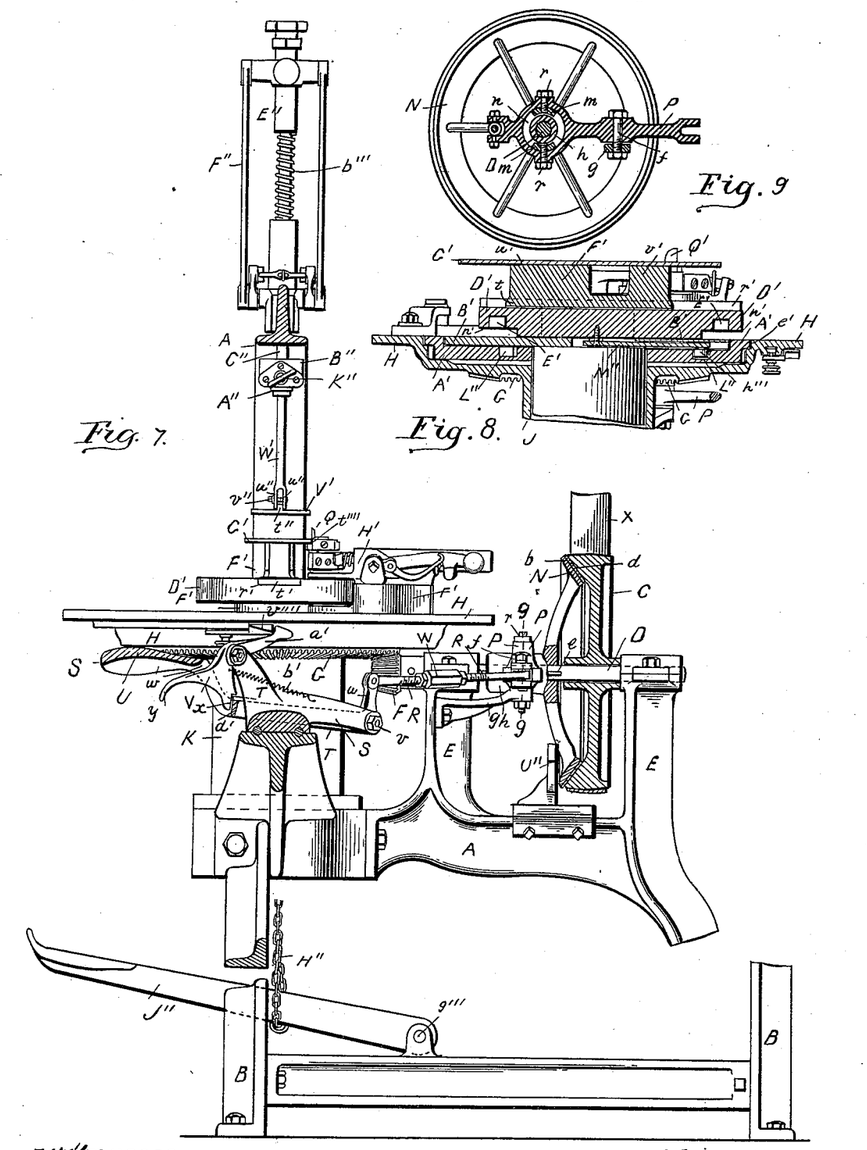
Fig. 7 is a partial central vertical section from front to rear and partial side view.
Fig. 8 is a detail transverse vertical section on line 8 8, Fig. 4.
Fig. 9 is a detail section on line 9 9, Fig. 7.

N is a circular rim or wheel having a bevel side b, which is adapted to fit an internal bevel-surface d of the pulley C, as shown in section in Fig. 7, the rim fitting loosely on the shaft D, so it can slide freely back and forth thereon, but connected thereto by a spline-joint e, so that the turning of the shaft will turn the rim or wheel with it.

P is a horizontal lever pivoted at f to an arm g of the frame and made in two parts, extending above and below the arbor h of the friction-wheel N and connected together at their ends, and each part having connected thereto a segment of a block m, one above and one below, and arranged to lie in a circumferential groove n of the arbor, as shown in Fig. 9 more particularly, and connected to the lever P by a screw r, one end of the lever having attached to it one end of a spiral spring Q, secured by its other end to an arm t of the frame. Attached by a pivot to the other end of the lever is a rod R, connected by its other end to the right-angular arm u of the lever S, pivoted at v to a part T of the frame and having a handle U for operating it.

Figure 1:
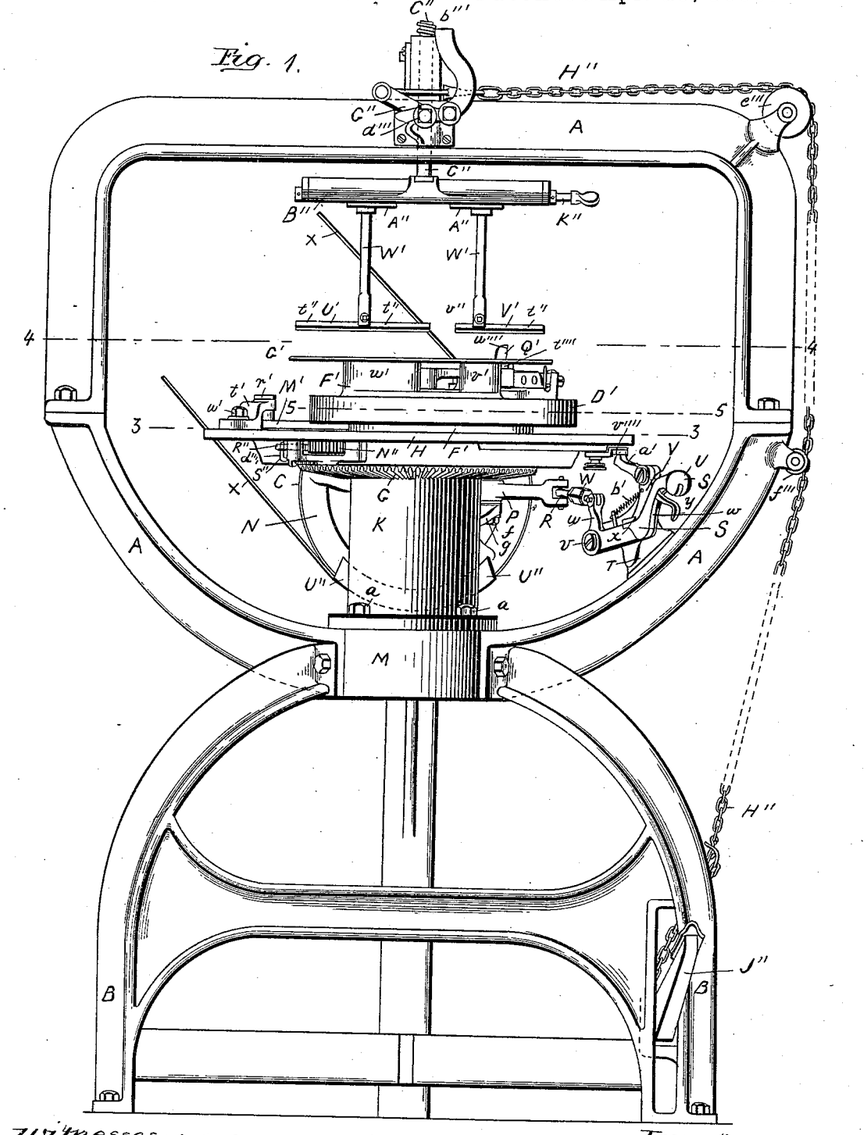
Figure 1 is a front view.

Pivoted to the upper end of the frame-arm T is pawl V, which extends through a vertical slot w in the lever S and has a notch x on its under side and a handle y for operating it, and an arm a', extending backward from its pivot and up to and under the plate or disk H.

b' is a spiral spring secured by one end to the pawl V and by its other end to the lever S, as shown in Figs. 1 and 7.

The connecting-rod R is made in two parts, their adjacent ends having screw-threads adapted to receive a right-and-left screw-nut W, so that by turning the nut the arm can be adjusted as to its length, as desired, in order to regulate the pressure of the clutch-rim N on the pulley.

The pulley C is connected by the belt X to the driving-power in any of the usual ways, and when the friction-wheel N is forced up against its seat in the pulley, which is done by depressing the lever S, it is there held by the engagement of the swinging pawl V of the lever by its notch $x$ with a shoulder or bar $d'$ of the lever, holding the lever S down, and if then the pulley is revolved the friction-wheel will be turned with it, and by its bevel-gear F the circular disk or plate H, which turns on its bearing on the stationary cylinder K. In the upper side of this plate H in a circular recess $e'$ is another circular plate or disk A', loosely surrounding the stationary cylinder K and fitting by its circular edge $f'$ the opening in the plate H, its upper surface being flush with the upper surface of the outer plate H. This disk A' also has a circular depression, in which lies a circular plate B', its upper surface being flush with the upper surfaces of the plates A' and H, but which is stationary, having a central transverse raised or rib portion C' on its upper side, it being secured to the top surface of the stationary cylinder K by the screws $g'$ $g'$ and $h'$ $h'$, four in number, screwing up through the top of the stationary cylinder, two ($h'$ $h'$) of which screws extend down to the bottom of the frame into convenient position for the turning of the same, as shown in Fig. 10.

D' is a plate having a central longitudinal elongated slot $m'$ in its under side, which freely fits over the transverse rib or raised projection C' of and rests on the fixed plate B', and is adapted to slide back and forth thereon longitudinally as to itself, but transversely of the machine. This plate D' has an endless groove or cam-slot E' in its under side, of the shape shown in section in Fig. 5 and in dotted lines and partial section in Fig. 4, the outer edge of the plate corresponding in outline to the shape of the cam-slot, and the under side of the cam-plate back from the edge toward the central portion a short distance beyond the cam-slot is cut away, as at $n'$ in Figs. 8 and 10. This cam-plate has a longitudinal groove $r'$ on its upper side adapted to engage with a tongue or rib $t'$ on a block F', secured on the top of the rib C' of the plate B' by the two screws $g'$, as shown in Fig. 10, on which the cam-plate can freely move back and forth longitudinally, but which prevents its lateral movement. This block F' has two rests $u'$ $v'$, on which is placed and rests the iron pattern or form G' to which the boot or shoe sole is to be cut, the form having holes or sockets $w'$, which fit over vertical pins $x'$ of the two rests to hold the form laterally in place. (Shown in Fig. 4.)

Figures 4, 6:
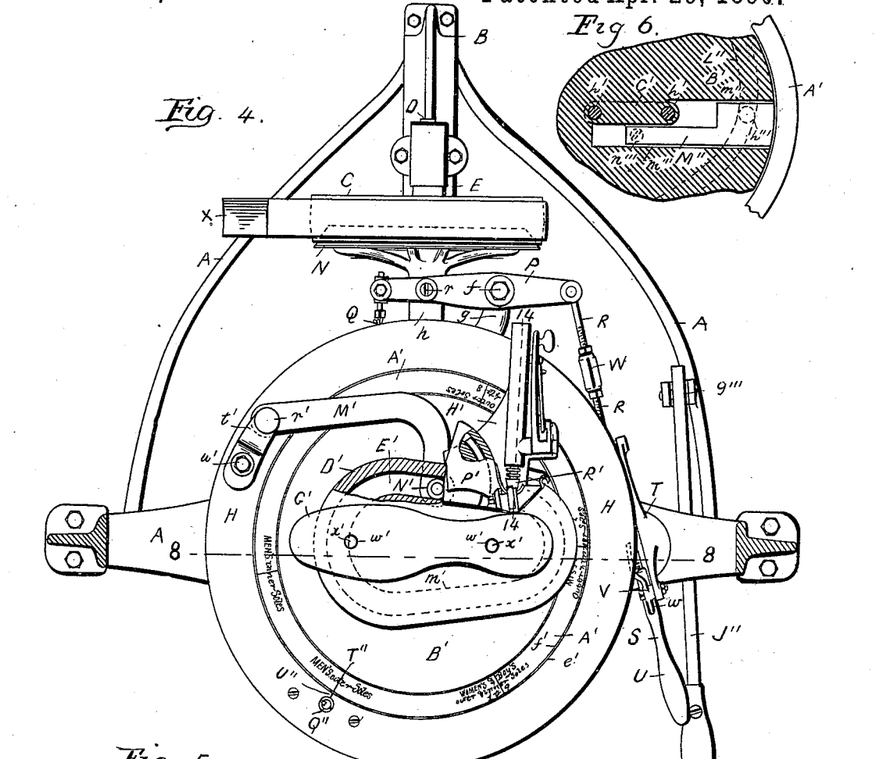
Figure 5:
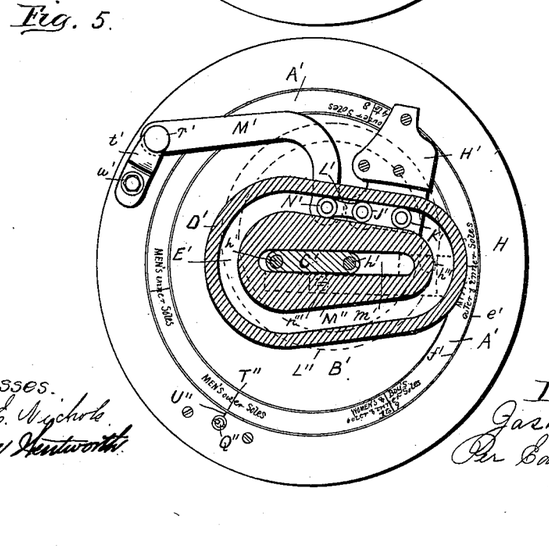
Fig. 5 is a detail plan view and below line 5 5, Fig. 1.

H' is a block which extends under the cam-plate a short distance in the cut-away portion $n'$, and has pivoted on its upper side two friction-rollers J' K', which are adapted to fit and run in the cam-slot E'. Connected to the pivot of the roller J' is a link L', in turn connected by a pivot to the free end of a lever M', pivoted at $r'$ to the outer plate or disk H and a bracket $t'$, secured thereto by a screw U', the free end of the lever also having a friction-roller N', which is adapted to fit and run in the cam-slot E, all as shown in Figs. 4 and 5 more particularly. This block is made in two parts, the upper one $v'$ being secured on top of the lower one by the screws $w'$, passing up from the bottom, and to this upper one is pivoted at $y'$ a triangular-shaped plate P', which carries the knife or cutter Q'. This triangular plate is arranged to swing horizontally on its pivot $y'$ and is guided in its movement by an L-shaped tongue or rib $a''$ on its under side engaging with a correspondingly-reversed L-shaped tongue or rib $b''$ on the part $v'$, both concentric to the pivot $y'$, by which the triangular plate is prevented from lifting from the part $v'$, but can freely slide thereon, and when desirous of removing the plate P' it can be swung to the left (see Fig. 15) free and clear of the lower part, so that it can then be detached, as desired. Bearing against one edge or side of this plate P' at $d''$ is a pin R', arranged to move back and forth in a socket $e''$ of the block H', having a spiral spring $f''$ encircling it, which bears against the rear end of the socket $e''$ and a shoulder $g''$ on the pin, pressing the pin by its tension against the knife-carrying plate P'.

The knife Q' is secured by its right-angular portion on a block or holder S', and is held firmly in place between a shoulder $h''$ on the block S' and shoulder $m''$ on the block $n''$, secured by a screw $r''$ to the main block, the turning up of which screw firmly holds the knife or cutter in place. The knife-holder has a pivot T', which fits and freely turns in a socket $t''$ in the plate P'.

U' V' are two plates above the form, the one U' substantially of the outline of the ball and the other V' of the heel of the sole, each of which plates has a longitudinally square-shaped rib $q'$ on its upper surface, which fits in between the two arms $u''$ of a downwardly-projecting rod W' and secured by a screw $v''$, each rod W' having a cross head or piece A'' at its upper end, arranged to slide back and forth in a groove $w''$ in the under side of a horizontal bar B'', secured to the lower end of an upright rod C'', arranged to move up and down in a vertical socket $a'''$ in the upper bar D'' of the frame, its upper end screwing into a socket in a cross-head E'', having a spring $b'''$, of a frame $f''$, the lower end of which frame is connected by a knuckle-joint G'', pivoted at $d'''$ to the frame to one end of a chain H'', which passes over rollers $e'''$, and by its other end connected to the treadle J'', pivoted at $g'''$ to the lower cross-bar F'' of the frame.

A right and left screw K'' engages with the blocks A'', arranged to turn freely in the bar B'', but not to move longitudinally therein, by which turning the screw in one direction will move the blocks A'' and their holding-clamps U' V' toward and in the other direction from each other.

In the upper side of the disk or plate A' is a circular groove L'' eccentric to the central axis of the plate, in which is adapted to run a friction-roller $h'''$, pivoted on the under side of a bar M'', adapted to slide back and forth in a groove $m'''$ in the under side of the plate B' and at one side of the raised rib C', the bar M'' being secured at its other end by a screw $n'''$ to the under side of the cam-plate D'.

Figure 3:
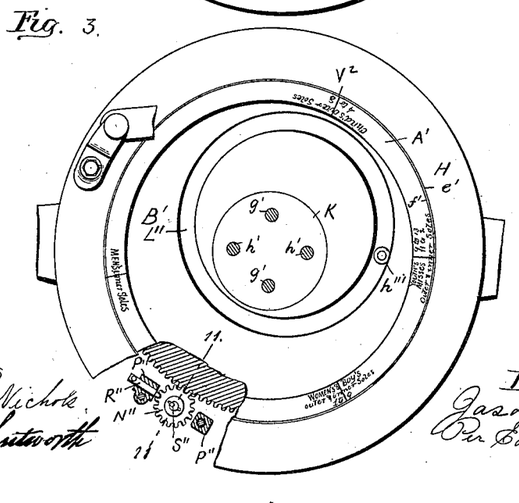
Fig. 3 is a detail plan view below cross-section line 3 3, Fig. 1.
Figure 11:
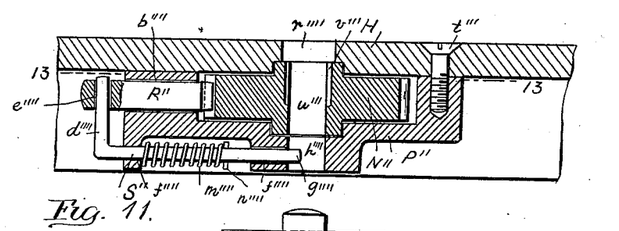
Figs. 11 and 12 are detail vertical cross-sections on line 11 11, Fig. 3, showing the parts in two positions.
Figure 12:
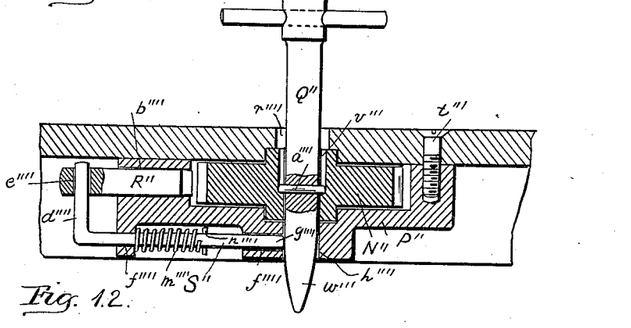

The eccentric-groove plate A' has gear-teeth $r'''$ on its periphery, which are arranged to engage with the teeth of a small gear or pinion wheel N'', turning in a bearing on the under side of the outer plate H, and a block or support P'', secured to the under side of the outer plate by screws $t'''$, as shown in Figs. 3, 11, and 12 more particularly. This gear-wheel N'' has a central passage or opening $u'''$ through it and a cross-slot $v'''$ in its hub, in which passage a wrench-pin Q'', having a tapering point $w'''$, is adapted to be inserted, having a cross-pin $a''''$ to fit in the cross-slot $v'''$ of the gear.

Figure 13:
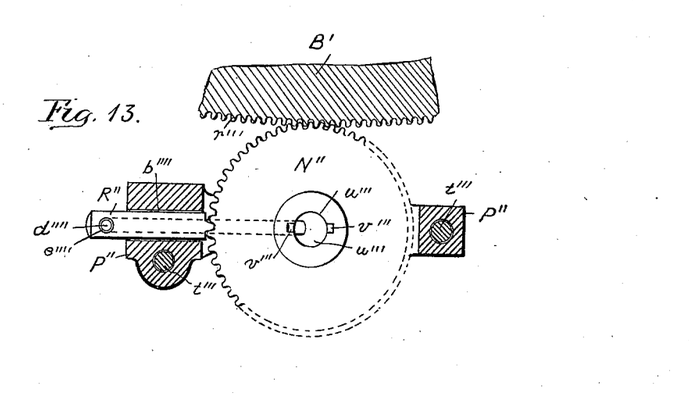
Fig. 13 is a detail plan view on line 13 13, Fig. 11.
Figure 14:
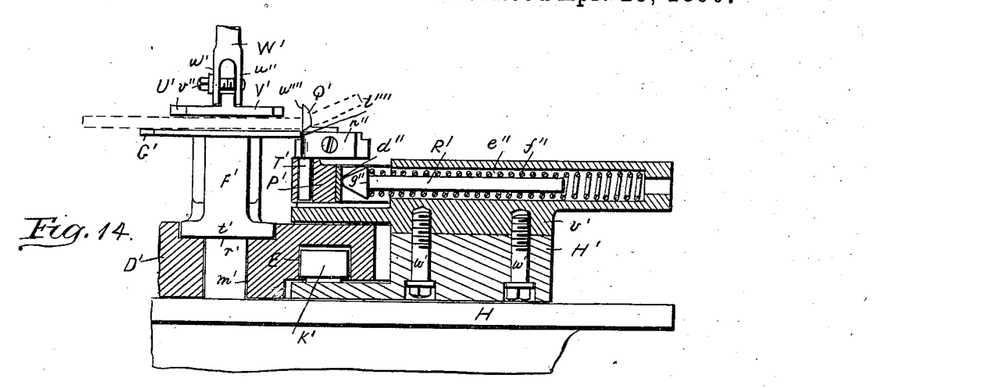
Fig. 14 is a detail vertical section on line 14 14, Fig. 4.

R'' is a pin arranged to move in a horizontal socket $b''''$ in the block P'' and to engage by its inner end with the teeth of the gear-wheel N'', as shown in Figs. 11 and 13. Connected to this pin R'' by a right-angular arm $d''''$, fitting in a transverse socket $e''''$ in the pin R'', is a rod or bar S'', arranged to slide back and forth horizontally in sockets $f''''$ in the block, its end $g''''$ extending into an opening $h''''$ in the block P'' below the central passage $u'''$ in the gear-wheel, this rod having a spiral spring $m''''$, which bears by one end against a cross-pin $n''''$ on the bar S'' and a shoulder of the block, the tension of which spring holds the rod in the block-opening $h''''$, and through its connection with the pin R'' its engagement with the gear-wheel N'', as shown in Figs. 11 and 13, unless otherwise acted upon, preventing any movement of the gear-wheel N'', and consequently through its engagement with the eccentric plate B' such plate from movement.

To move the plate A', the wrench-pin Q'' is pressed down into the gear-wheel opening $a'''$ and block-opening $h''''$, its tapering end as it is moved down pressing the bar back and its pin R'' out of engagement with the gear-wheel N'', as shown in Fig. 12, when by turning the wrench-pin the gear-wheel, and thus the circular plate A', are turned as desired, moving the wrench-pin. The spring $m''''$ forces back the bar S'' and the pin R'' into its engagement with the gear-wheel N'', locking it and the eccentric plate A' from movement.

Figure 2:
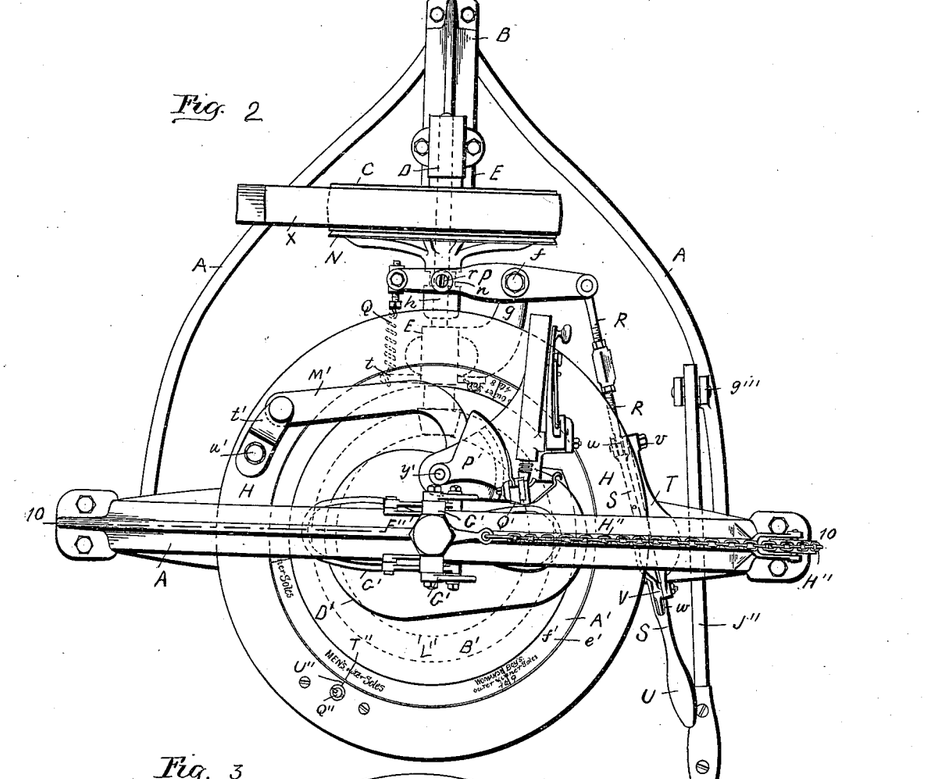
Fig. 2 is a plan view.
Figures 15, 16:
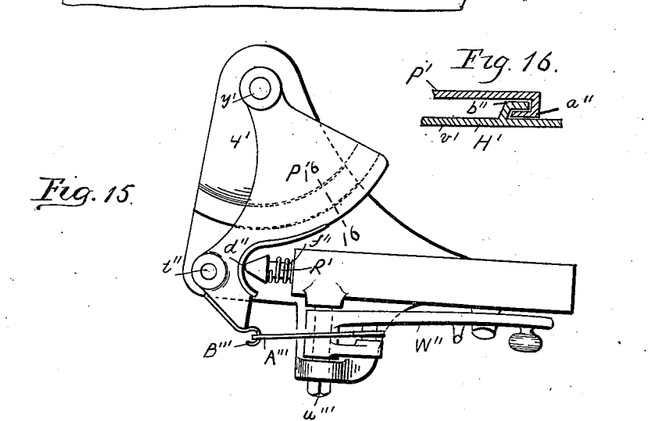
Fig. 15 is a detail plan view of Fig. 14.
Fig. 16 is a detail cross-section on line 16 16, Fig. 15.
Figure 17:
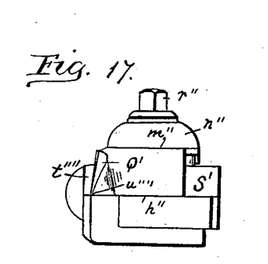
Fig. 17 is a plan view of the knife or cutter and its holder.
Figure 18:
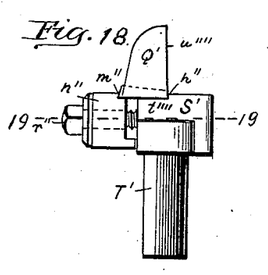
Fig. 18 is a front view of the cutter and holder.
Figure 19:
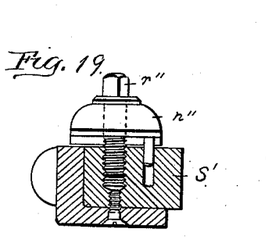
Fig. 19 is a detail section on line 19 19, Fig. 18, with the figure turned quarter round.

The operation of the machine is as follows: With the machine, as shown in Figs. 1, 2, and 4 more particularly in the drawings, in its normal position, ready to cut a sole of a boot or shoe from a piece or strip of leather, the pattern or form for the desired size for the boot or shoe sole is first selected, according to the size and shape desired, and placed on the block F', its two sockets $w'$ fitting over the pins $x'$. (Shown in Fig. 4.) The wrench-pin Q'' is then inserted in the opening in the small gear, an opening above it in the plate H allowing for such, and turned, which turns such gear and the eccentric-groove plate B' until the mark T'' on the plate A' at the words "Men's outer soles" comes opposite to the mark U'' on the plate H and wrench-pin, as shown in Figs. 2, 4, and 5, which by the movement of the eccentric groove around the central axis moves the cam-plate to the right or left, as the case may be, and brings it in proper position for the operation of the knife to cut the sole from the material in accordance with the pattern or form, which in the present instance is a pattern or form for men's outer soles. When thus set, the strip of leather from which the sole is to be cut, of the right width for the length of sole, is placed in position on top of the form G' and then the treadle J'' moved down, which through its chain connected to the lever moves down the clamps or holding-plates U' V' onto and presses and holds firmly between them and the form the leather strip. The hand-lever is then depressed until its spring-pawl V engages by its notch $x'$ with the bar $d'$, which moves and firmly holds the clutch-wheel N with the pulley, when the pulley, being in motion, turns by its gear the circular or outer plate H, which by the lever M' and link-connection L' to the knife-carriage carries it around the pattern, the part $t''''$ of the knife-holder bearing on the edge of the pattern and gaging the distance of the knife-edge from the same, and as the knife is carried around the pattern its edge $u''''$ cuts through the thickness of the leather according to the shape of the pattern, and when the whole sole is cut, and just as the knife and all parts return to their starting-place, an inclined plane $v''''$, secured to the under side of the circular plate H, bears and rides upon the end of the arm $a'$ of the spring-pawl V, and, swinging the pawl upon its pivot, moves its notch $x$ out of engagement with the bar $d'$, which allows the spring Q of the lever P to act upon and pull it back, and with it the clutch-wheel from its engagement with the pulley back where it bears and rests against a plate U'', secured to the frame, and serving as a brake to stop the clutch-wheel, and thus the machine, leaving the machine in its normal position ready for another sole to be cut. The treadle being now allowed to rise, the spring $b'''$ acts to raise the clamps U' V', leaving the cut sole free to be moved from the form, when the leather strip is turned over (in order to make rights and lefts) and placed in position on the form for another sole to be cut in the same manner as before, and so on. When desirous of cutting another size of sole—for instance, children's soles—the wrench-pin Q'' is inserted in the gear-opening $u'''$ and the gear and wheel plate A' revolved until the mark V'' is opposite to or in line with words "Child's outer soles" on the plate A, is opposite to the mark U'' and wrench-pin on the plate H, when the wrench-pin is removed, the plate A' then being set and locked, the pattern or form is removed and another form or pattern of the proper size and shape placed on the support, and the machine operated as before. In turning the plate A' its eccentric groove L'', revolving around the central axis, carries the cam-plate by its connection therewith by the bar M'' to the right or left, as the case may be, and places it in position for the proper guidance of the knife-carriage by its friction-rollers in the cam-slot to suit the various sizes of soles of boots and shoes from the shortest length and width to the longest length and width, which is regulated by the position of the eccentric in relation to the central axis of the machine. As the eccentric is carried around the central axis by the turning of its plate it carries the roller-pin of the sliding bar M'', connected to the cam-plate, to the right or left or from or toward the central axis in a longitudinal line correspondingly, the cam-plate being arranged to move only longitudinally as to itself and transversely as to the machine. When changing the form or pattern, the knife-holder S' is held back from its bearing against the edge of the form or pattern by the lever W'', pivoted at $u'''$ to the block H', having connected thereto a hook A'''. The lever W'' is swung over to the left and the hook A''' swung over and made to engage by its hook with a hook B''' on the plate P', as shown in Fig. 15, when the lever is swung back into its normal position, carrying back or to the right the plate P' against the spring $f''$, which moves the swinging plate P' back against the spring $f''$, and thus the knife-holder clear and free of the form or pattern, when the pattern can be removed and another put in its place, the lever W'' then being swung over to the left again, letting the knife-holder back against the edge of the form, when the hook is released and the lever and hook swung over into their normal positions.

When changing pattern from the extreme sizes, the blocks F', on which the patterns rest, is removed, and a smaller or larger one placed in position, and that is done by unscrewing the two screws $h'$ (see Fig. 8) sufficient therefor and screwing them in again to secure the changed block.

Having thus described my invention, what I claim is—

1. The combination, with a pattern to which a boot or shoe sole is cut and a carriage having attached thereto a cutter and pivoted to a support on a plate adapted to revolve and carry said carriage around said pattern, of a plate having a cam-groove with which said carriage engages and mechanism connected to said plate to give a longitudinal reciprocating movement thereto on a suitable support in the operation of the machine, for the purpose specified.

2. The combination, with a pattern to which a boot or shoe sole is cut and a carriage having attached thereto a cutter and pivoted to a support on a plate adapted to revolve and carry said carriage around said pattern, of a plate having a cam-groove with which said carriage engages and said plate engaging with a circular groove in a plate arranged to be revolved on a suitable support, said circular groove being eccentric to the axis of its plate.

3. The combination, with a pattern to which a boot or shoe sole is cut and a carriage having attached thereto a cutter and pivoted to a support on a plate adapted to revolve and carry said carriage around said pattern, of a plate D', having a cam-groove F', with which said carriage engages, and said plate attached to a bar M'', arranged to slide back and forth in a suitable bearing in said support and engaging with a circular groove L'' in a plate arranged to be revolved on a suitable support, said circular groove being eccentric to the axis of its plate.

4. The combination of a disk or plate A', arranged to turn on a suitable support and having an eccentric groove or slot L'', with which engages a plate D', provided with a cam slot or groove E' for engagement with a carriage carrying a knife or cutter, and provided with means for locking and unlocking said revolving disk or plate B', for the purpose specified.

5. The combination, with a disk or plate A', arranged to turn on a suitable support and having an eccentric groove or slot L'', with which engages a plate D', provided with a cam slot or groove E' for engagement with a carriage carrying a knife or cutter, and provided with a gear $r'''$, of a gear-wheel engaging with said plate-gear and having means for locking and unlocking said revolving disk or plate B'.

6. The combination, with a disk or plate A', arranged to turn on a suitable support and having an eccentric groove or slot L'', with which engages a plate D', provided with a cam slot or groove E' for engagement with a carriage carrying a knife or cutter, and provided with a gear $r'''$, of a gear-wheel N', engaging with said plate-gear, and a pin or bolt R'', arranged to slide in guideways on a suitable support and to engage with said gear-wheel, and connected to a spring pin or rod S'', arranged to project into a central passage in the bearing of the gear-wheel, for the purpose specified.

7. The combination, with a revolving plate or disk H, of a block or carriage carrying a knife or cutter, a link L', and lever M', the link being connected to the block or carriage and the lever pivoted to the revolving plate or disk, for the purpose specified.

8. The combination, with a revolving plate or disk H, carrying the knife or cutter block or carriage and provided with a mark or indication, of a disk or plate A', provided with an eccentric groove L'' for operation on a longitudinally-reciprocating plate D', having a cam-groove E', engaging with the knife-carrying block or carriage and having on its surface marks or indications of the sizes of boots or shoes, and adapted to be moved for said marks or indications to be brought in line, as desired, with the mark or indication on the plate H, for the purpose specified.

9. In a sole-cutting machine, the combination, with the pattern or form to which the sole is cut and a knife or cutter for cutting the sole, of clamps or presser-plates U' V', each arranged to move back and forth in a guideway in a suitable support and engaging with a right and left screw in said support, for the purpose specified.

In testimony whereof I have hereunto set my hand in the presence of two subscribing witnesses.

JASON SMITH.

Witnesses:
EDWIN W. BROWN,
CARRIE E. NICHOLS.